United States Patent [19]

Buettner

[11] Patent Number: 4,715,232

[45] Date of Patent: Dec. 29, 1987

[54] FLOW MEASURING SYSTEM WITH BACKFLOW PREVENTING MEANS

[76] Inventor: Carl F. Buettner, 9501 Pine Spray Ct., St. Louis, Mo. 63126

[21] Appl. No.: 900,186

[22] Filed: Aug. 25, 1986

[51] Int. Cl.[4] .............................................. G01F 1/37
[52] U.S. Cl. .............................. 73/861.49; 73/861.65; 137/592
[58] Field of Search ........... 73/861.65, 861.49, 861.51, 73/272 R, 706, 747, 748, 749, 750; 137/247.41, 592

[56] References Cited

U.S. PATENT DOCUMENTS 3,048,039 8/1962 Hackler .............................. 73/706
4,045,184 8/1977 Haralampievnx et al. ......... 137/592

Primary Examiner—Herbert Goldstein
Attorney, Agent, or Firm—Haverstock, Garrett & Roberts

[57] ABSTRACT

A flow measuring system for flowing liquids utilizing a pitot rod, snubbing vessels and a manometer to determine mean flow velocities and profiles. The snubbing vessels effectively prevent any back flow of indicating fluid into the main pipeline conduit.

19 Claims, 4 Drawing Figures

FLOW MEASURING SYSTEM WITH BACKFLOW PREVENTING MEANS

BACKGROUND OF THE INVENTION

The present application relates to a flow measuring system for flowing liquids under pressure, such as in pipelines and the like, more particularly, it relates to such a flow measuring system employing a manometer and a pitot rod having at least two orifices and wherein upset or temporary inversion of the manometer will not result in backflow of any indicating liquid into the primary liquid carrying pipeline.

In measuring and determining values of mean velocity and total flow in liquid carrying pipelines and the like, there are usually employed pitot rods having at least two isolated orifices of equal size, generally located at 180° from each other. These pitot rod orifices are usually connected by means of fixed and/or flexible tubing to a manometer, pressure guage or pressure differential recorder. The manometer is among the most accurate because of its direct-reading nature.

Manometers generally employ liquids, usually colored by dyes, which are not soluble or miscible with the flowing liquid being measured, such as water, to enable accurate meniscus readings to be taken and recorded. These indicating liquids are generally heavier than the liquid being measured such as water, in contrast to butane, gasoline, benzene and other hydrocarbon liquids which are lighter than water and they are also immiscible with the liquid being measured in contrast to the lower alcohols such as methanol and ethanol which are fully miscible with water. Useful indicator liquids include carbon tetrachloride, tetrachloroethane, trichloroethylene and the like.

During use it is possible for a manometer to fall over or even to be inverted. When this happens the heavier liquid used as indicator liquid can flow back into the pipeline in which the velocity and flow of a liquid is being determined. This is to be avoided because some of the indicator liquids used are toxic or may be carcinogenic and thus their total exclusion from such flowing liquids as potable water supplies is highly desirable.

To avoid the above difficulties a manometer flow measuring system has been developed which insures against any possible backflow of manometer indicating liquid into the pipeline in which flow is being measured. The entire assembly is comprised of a pitot rod having at least two orifices, a manometer, two snubber vessels and connecting tubing and valves. The assembly is employed to determine flow velocities and flow volumes of flowing liquids in a pressurized conduit, part of a pressurized system of liquid transport and/or distribution. Generally, those pressurized systems in which contamination by such heavier liquids is to be most carefully avoided are potable water distribution systems for municipalities or the like.

Accordingly it is a principal object of the present invention to provide a flow measuring system that will prevent the backflow of heavier liquids into a pressurized liquid flowing in a conduit.

Another object of the present invention is to provide such a flow measuring system wherein the added novel members are easily integrated with other parts thereof.

Another object of the present invention is to provide a flow measuring system which is durable and not easily damaged.

Still another object of the present invention is to provide snubbing vessels which act to prevent backflow of heavier liquids therethrough.

These and other objects and advantages will become apparent after consideration of the following specification in conjunction with the accompanying drawings wherein.

DESCRIPTION OF THE PREFERRED EMBODIMENTS

In measuring mean velocities of flow of liquids flowing in a conduit the flowmeter equipment used generally consists of a pitot rod having two oppositely disposed orifices in a common plane, one facing upstream and the other downstream in the conduit in which the liquid is flowing, and a pressure differential guage or, more preferably, a directly-read manometer usually consisting of a transparent U-tube containing an indicating liquid. Even though the manometer tube and associated valving is frequently mounted on a backing member of some type its stability is not insured and it may be overturned through carelessness or lack of knowledge. Thus, when the manometer is in use for recording readings it can be knocked over or otherwise disturbed from its normal vertical attitude, even possibly inverted. When this occurs the contained indicating liquid, which is heavier than the liquid being measured, can flow backward into the connecting tubing and possibly into the conduit of flowing liquid. The purpose of the present invention is to provide a flow measuring system which incorporates means to prevent such undesirable occurences.

The measuring system of the present invention comprises three principal parts, a pitot rod provided with oppositely facing orifices, a differential indicating tube or manomoter tube which is adapted to contain an indicating liquid and two sealing chambers or snubbers located between the first named parts, all provided with suitable cut-off valves and connecting flexible tubing. When assembled the present measuring system can be conveniently charged with indicating liquid and liquid to be measured for flow velocity, purged of air or other gases and used to record the readings desired.

The sensing element of the present flow measuring system is a pitot rod suitable for sensing both upstream and downstream pressures. Such pitot rods are known and are of a variety of designs. The simplest type has at least two oppositely disposed orifices located approximately 180° from each other and generally in the same plane. Others, of the averaging type, have two or more pairs of orifices on the upstream face and an averaging tube which serves to sense an average dynamic pressure. Such dynamic pressure is usually compared to a static pressure sensed via a single orifice in the downstream face. Any of such pitot rods can be used with the measuring system of this invention, but the preferred ones are those of the simplest, two orifice type. This is due in part to the ability such pitot rods display of generating a flow profile across the diameter of a conduit by locating the pitot rod orifices at various selected locations across the conduit diameter. Such pitot rods are fabricated of metal parts except for rubber seals and O-rings and generally are made of brass, preferably water works grade brass.

Figure 1:
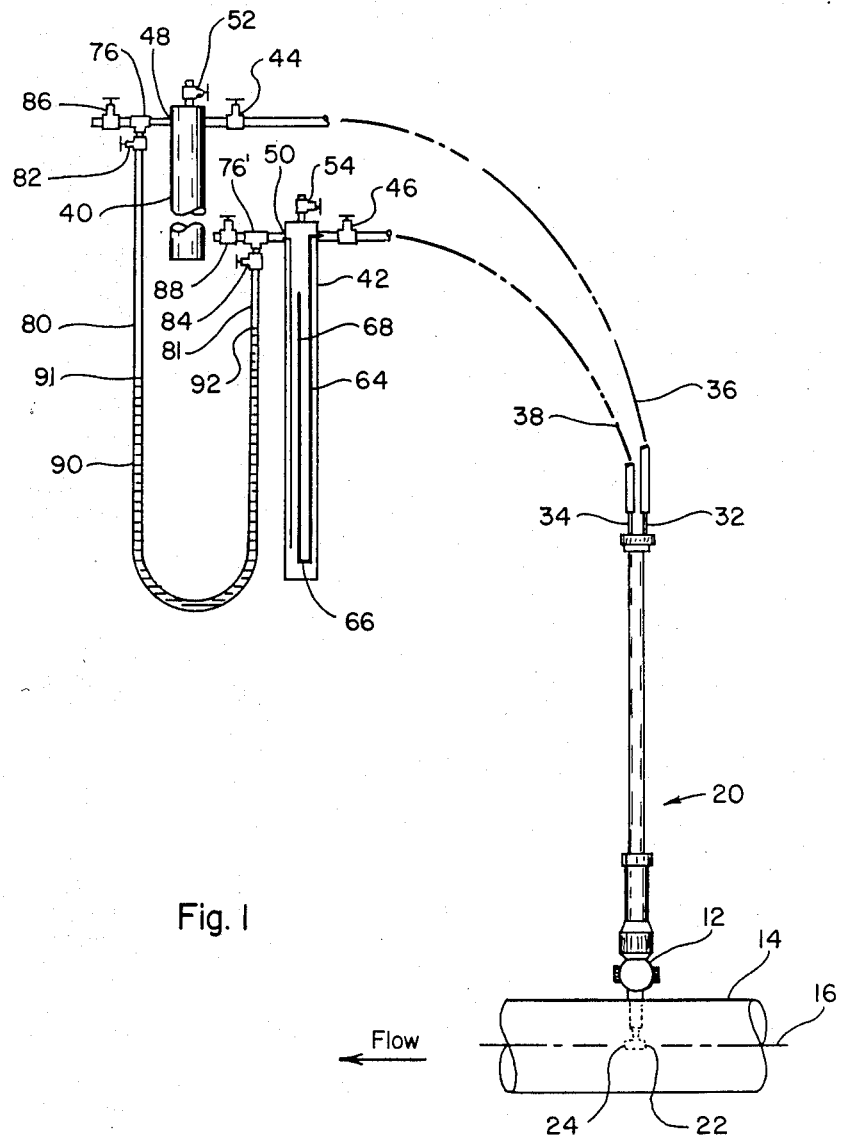
FIG. 1 is a schematic view, partially in section, showing the flow measuring system as installed.
Figure 2:
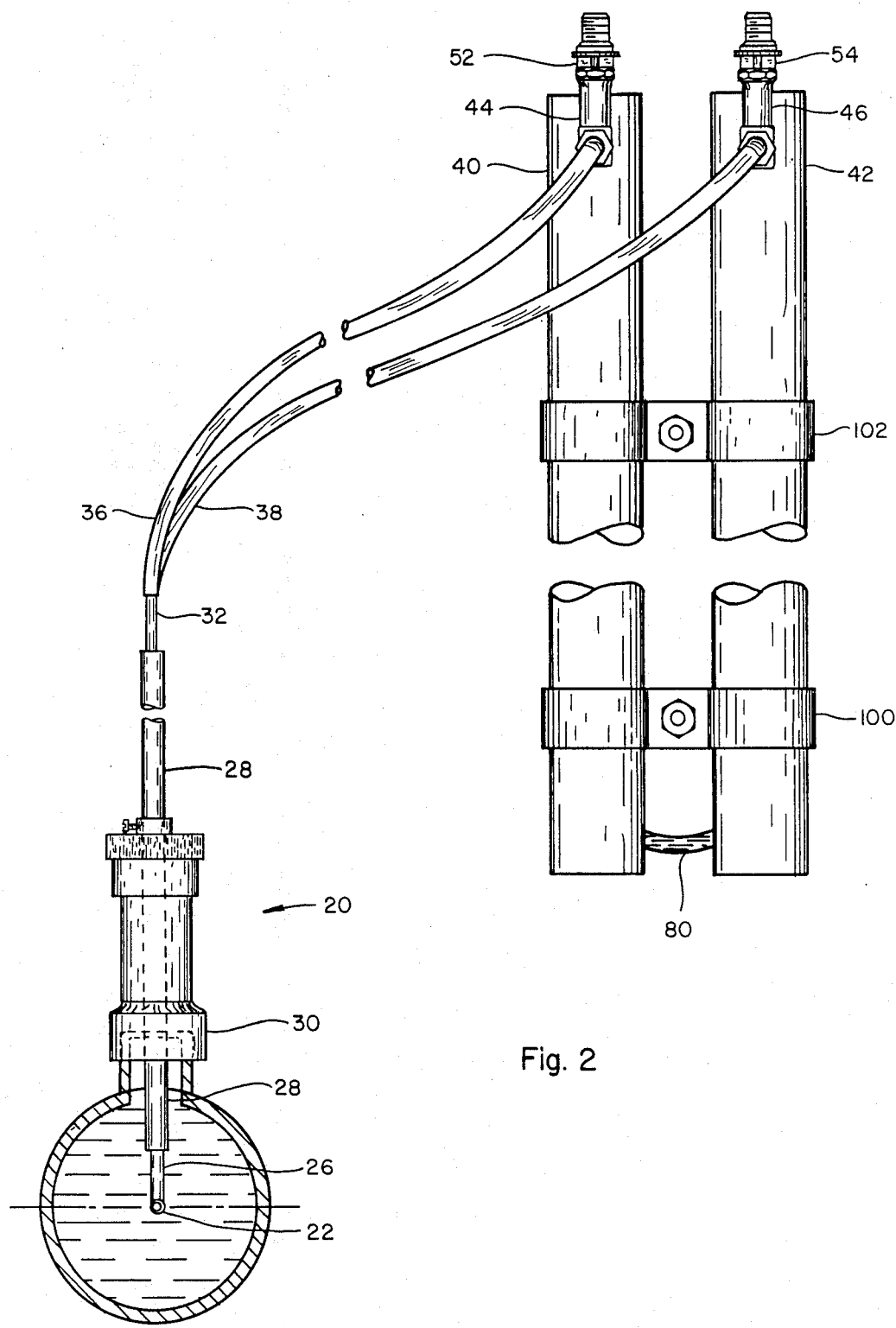
FIG. 2 is a rear elevation view, partially broken away, showing the flow measuring system as installed.
Figure 4:
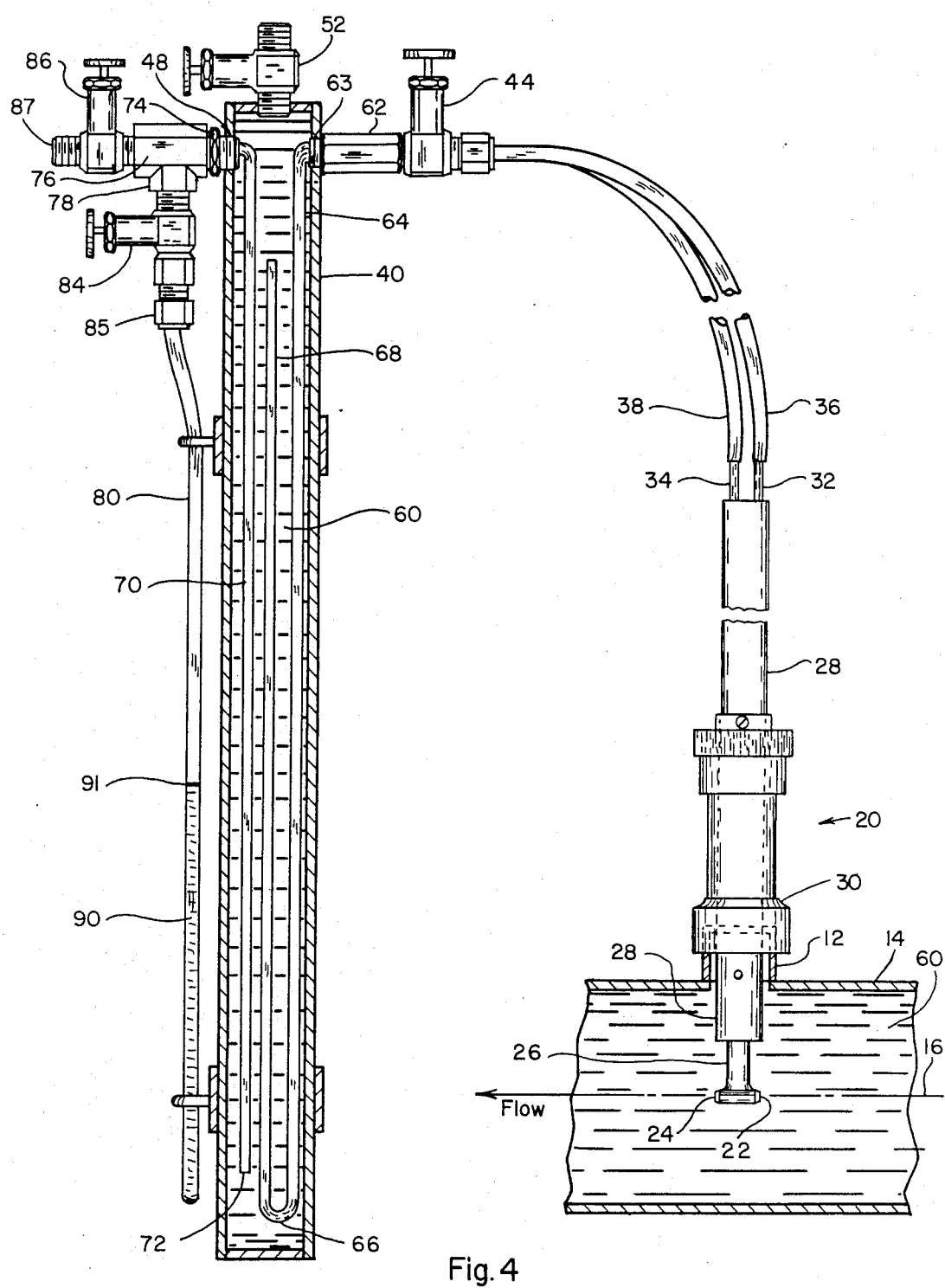
Fig. 4 is a side view, partially in section along line 4—4 of FIG. 3, showing the flow measuring system as installed.

In FIG. 1 there is shown schematically a pitot rod 20 mounted on a cock 12 installed in a conduit 14 with the orifices 22 and 24 thereof, aligned with the centerline 16 of conduit 14. In FIGS. 2 and 4 the pitot rod 20 is shown in more detail. In FIG. 4 the pitot rod 20 is shown attached to cock 12 by pitot rod sleeve 30 and the pitot rod sheath 28 and pitot blade 26 passed into conduit 14. Orifices 22 and 24 carried by pitot blade 26 are positioned at the centerline 16 of conduit 14. Pitot tubes 32 and 34 pass through the pitot rod sheath 28 and are fixedly attached as by soldering to the pitot blade 26 having continuous passages to the upstream orifice 22 and downstream orifice 24, respectively. At their upper ends pitot tubes 32 and 34 are attached to flexible tubing members 36 and 38, respectively, by which the liquid under the respective upstream and downstream pressures is transmitted to the snubbers 40 and 42 and in turn to the manometer U-tube 80, 81.

Figure 3:
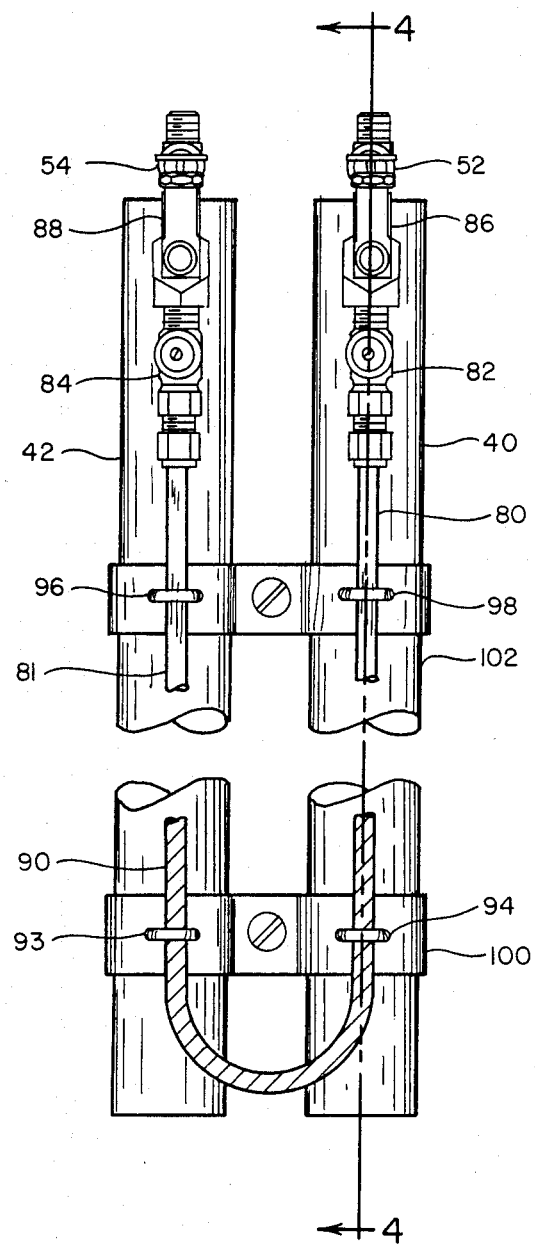
FIG. 3 is a front elevation view, partially broken away, showing the manometer and snubber vessels.

The manometer, as shown in FIGS. 1 and 3, consisting of a one-piece transparent U-tube, usually a glass or plastic tube, with legs 80 and 81 and associated valves 82, 84, 86 and 88 is conveniently mounted on snubbers 40 and 42 by means of U-shaped holders 93, 94, 96 and 98 mounted in brackets 100 and 102, which brackets position the snubbers 40 and 42. The manometer can, alternatively, be mounted on a separate backing board or frame, if desired. The manometer U-tube 80 and 81 is charged with an indicating liquid 90 heavier than the liquid being measured and conventionally containing a dye to enhance visibility of the menisci 90 and 92 for comparison of heights in the respective legs 80 and 81 of the U-tube.

The snubbers 40 and 42, as shown schematically in FIG. 1 and in cross-section in FIG. 4, are elongated metal closed cylinders adapted for filling with the liquid 60 being measured. The snubbers are conveniently fabricated of brass, preferably water works grade brass. They are equipped with inlet valves 44 and 46, outlets 48 and 50 and vent or overflow valves 52 and 54 all located at or adjacent the upper ends of the snubber cylinders 40 and 42. Snubbers 40 and 42 are identical; hence the interior construction thereof will be described with reference to snubber 40 illustrated in most detail in FIG. 4, but such description is fully applicable to the other such snubber 42.

Snubber 40 contains a U-tube having a longer leg 64, a base section 66 and an upstanding leg 68. The upper end of U-tube longer leg 64 is attached via inlet 63 and nipple 62 to valve 44 and thence to flexible tubing member 36 leading from the upstream orifice 22 of pitot rod 20. The upstanding leg 68, which is slightly shorter than leg 64, terminates in an open end adjacent the upper end of closed cylinder 40. A down-extending tube 70 extends from outlet 48 to an open end 72 adjacent the lower end of closed cylinder 40. The down-extending tube 70 communicates via outlet 48 and nipple 74 with T-joint 76. The straight segment of T-joint 76 is connected to valve 86 with open end 87 and the branch 78 of the T-joint 76 is connected to valve 84 which in turn is connected to an upper end of manometer tube leg 80 via nipple 85, thus completing the communication of leg 80 of the U-tube with down-extending open ended tube 70 in the interior of snubber 40.

In use the equipment is first assembled as shown schematically in FIG. 1 and the pitot rod 20 connected through cock 12 to project pitot blade 26 into the conduit 14 and to position the up and downstream facing orifices 22 and 24 in a plane coinciding with the centerline of conduit 14. Such location can be determined by use of a pipe caliper, a tool familiar to hydrologists and water engineers, and adjusting the projecting length of pitot sheath 28 to the thus indicated length to place the tip of the pitot blade 26 at one-half the diameter of the conduit 14. This locates the orifices 22 and 24 on the centerline 16 of the conduit 14. Once assembled and set erect the manometer U-tube 80, 81 is charged via valves 88 and 84, after valves 86 and 82 are opened, with sufficient indicating liquid 90, a liquid heavier than the liquid flowing in conduit 14, to partially fill both legs 80 and 81 to about half the length of U-tube 80, 81. Valves 84, 88, 82 and 86 are then closed.

To fully charge the apparatus with liquid to be measured valves 44 and 52 are opened to allow the liquid to enter and fill snubber 40 until all air is expelled and liquid flows from overflow valve 52. Valve 52 is then closed. The same steps are repeated with valves 46 and 54 to expel air and fill snubber 42. Thereafter with overflow valves 52 and 54 closed the manometer U-tube is pressurized with liquid from snubbers 40 and 42 by opening valves 82 and 86 as well as 84 and 88. When both legs of the U-tube 80 and 81 are filled, air expelled and only liquid flows from valves 86 and 88 all valves are closed including valves 44 and 46 to check for possible air leaks.

To assure proper pressure differential readings the indicating liquid response is checked by slightly opening valves 44, 82 and 88 and cracking valve 84 as control valve to allow the miniscus 91 to move down in leg 80 and miniscus 92 to move up in leg 81. When miniscus 92 approaches the top of U-tube leg 81 valve 84 is closed to prevent loss of indicating liquid 90. This procedure should also expel any remaining air bubbles through valve 88. The procedure is reversed by opening valves 46, 84 and 86 and cracking valve 82 as the control valve. The result will be a shift in miniscus 91 upwardly in leg 80 and expelling of air bubbles from valve 86. These air bleeding procedures are repeated several times for each of legs 80 and 81 until the operator is assured that all air has been expelled; then valves 86 and 88 are closed.

With valves 44, 46, 82 and 84 open operations measuring the upstream and downstream pressure differential at the centerline 16 of conduit 14 are begun. Such pressure differential as sensed at orifices 22 and 24 of pitot rod 20 is accurately reflected in the difference between the height of meniscus 91 and meniscus 92 of the indicating liquid 90 in manometer U-tube legs 80 and 81. From these readings a mean flow velocity of liquid 60 can be determined. By rotating the pitot rod 20 180° in the conduit 14 to exchange orifices 22 and 24 relative to the direction of flow of liquid 60 an exactly equal and opposite deflection of the menisci 91 and 92 of indicating liquid 90 in the respective legs 80 and 81 will result. Such a result assures that both orifices are open and clear of blockages and that the entire system is free of entrained or entrapped air.

With suitable relocation of the orifice-bearing tip of pitot blade 26 to points near the interior walls of conduit 14 a liquid flow velocity profile across the entire diameter of conduit 14 can be determined for the liquid 60 flowing therein. Likewise, changes in such mean flow and flow velocity profile induced by opening or closing upstream or downstream valves, introducing obstructions into the conduit and the like can be determined and recorded. It is usually recommended that during extended periods of monitoring valves 52, 54, 86 and 88 be slightly opened periodically to expel any entrained air which may collect in the system.

The snubbers 40 and 42 serve to ensure, if an upset or accidental inversion of the snubbers and manometer U-tube 80, 81 should occur, that no part of the indicating liquid 90 can find its way back to conduit 14 carrying the flowing liquid 60, which is desirably to be kept free of such contaminating liquid. Because each of snubbers 40 and 42 are filled with the liquid 60 being measured and the indicating liquid 90 is heavier than liquid 60, any portion of the heavier liquid 90 which might find its way back through valves 84 or 82 and outlets 48 or 50 into and thru the down-extending tube 70 would collect at the lowest wall of snubber 40 and could not possibly enter U-tube 68, 66 and 64 or the corresponding U-tube in the other snubber 42. Upon restoring the equipment to its normal vertical position the small portion of indicating liquid 90 which exited down-extending tube 70 would collect at the bottom of snubber 40 or 42, far removed from open end of upstanding leg 68. Upon subsequent bleeding of the system to expel entrained or leaked air, such indicating liquid would also be entrained back into the manometer U-tube 80, 81 or expelled via valves 86 or 88.

Upon disassembly of the system from the cock 12 and conduit 14 the snubbers 40 and 42 can be drained via overflow valves 52 and 54 and thus any reverse flowed indicating liquid 90 removed from the equipment. Manometer U-tube 80, 81 can likewise be drained of both liquid being measured and indicating liquid through valves 82 and 86 and/or 84 and 88. The equipment would then be ready for reassembly at a new pipeline location, and recharging for reuse in monitoring pressure differentials.

There has been described a flow measuring system that operates in the familiar manner of manometers but prevents any possible backflow of heavier liquids as a result of tipping, falling or even total inversion of the monitoring equipment. Likewise, there has been provided novel snubbing vessels, easily integrated with other known parts of a flow measuring system, the entire system being durable and resistant to accidental damage. Thus, the objects desired are accomplished by the present invention.

Although the foregoing description and the drawings describe and illustrate a flow measuring system that fulfills the objects and advantages sought therefor, variations and modifications are contemplated as may be apparent to those skilled in the art and as may be accomplished within the scope of the claims which follow.

What is claimed is:

1. Means for measuring the flow of fluid in a conduit filled with a fluid under pressure comprising a conduit with fluid under pressure to be measured, means for responding to differential pressure at some location in the conduit including a sensing head having a pair of oppositely facing open ended orifices and a separate tube connected respectively to each orifice and extending therefrom through and from the conduit, a pair of normally upwardly oriented closed tubular chambers external of the conduit, each of said chambers having an input passage located near the upper end thereof in communication with a respective one of said tubes and an outlet passage, a supply of a first fluid filling each of said chambers, a U-shaped conduit in each of said chambers, each U-shaped conduit having one end connected to communicate with the input passage thereof and an opposite open end, said U-shaped conduits extending from adjacent to the upper end of the respective chamber downwardly to near the bottom of the chamber and then upwardly therefrom to a location in the chamber adjacent the upper end of said chamber, the outlet passage to each of the chambers including a tubular member having a first open end that extends downwardly to a position in the chamber adjacent the lower end of said chamber and an upper end communicating with the outlet passage, a differential indicating tube having a first end connected to communicate with the outlet passage of one of said chambers and a second end connected to communicate with the outlet passage of the other of said chambers, said differential indicating tube having a downwardly extending loop portion partially filled with an indicating fluid, the remaining portion being filled with the first fluid, the differential pressure sensed at the oppositely facing open ended orifices producing a height differential between the opposite ends of the indicating fluid in the differential indicating tube.

2. The means for measuring the flow of fluid of claim 1 including a valve member having an open and a closed condition positioned in each of said separate tubes connected to the orifices.

3. The means for measuring the flow of fluid of claim 1 including a second outlet passage at the top of each of said chambers and a valve member having an open and a closed position associated with each of said second outlet passages whereby the fluid contained in the chambers can be drained out when the chambers are overturned and the respective valves are open.

4. The means for measuring the flow of fluid of claim 1 including separate valves having an open and closed condition to control communication between the respective outlets of the chambers and the opposite ends of the differential indicating tube.

5. The means for measuring the flow of fluid of claim 1 including a shut-off valve associated respectively with each outlet of the respective chambers.

6. The means for measuring the flow of fluid of claim 1 wherein, when the said chambers are overturned, the open ends of the respective U-shaped conduits are so located that no part of said indicating fluid can enter said conduits and to thereby prevent backflow of indicating fluid from said chambers to the conduit filled with fluid under pressure to be measured.

7. The means for measuring the flow of fluid of claim 1 wherein the means for responding to differential pressure at some location in the conduit including the sensing head, include means for mounting the sensing head on the conduit containing the fluid to be measured and means for moving the sensing head to a position in the mounting means whereby the pair of oppositely facing open ended orifices are located at a predetermined position in the fluid whose flow is to be measured.

8. The means for measuring the flow of fluid of claim 7 wherein the means for moving the sensing head to a different position in the mounting means is adapted to be moved without moving said mounting means.

9. The means for measuring the flow of fluid of claim 1 wherein the supply of fluid filling each of said chambers comprises the fluid whose flow is being measured.

10. A snubbing vessel adapted for use in means for measuring the flow of fluid in a conduit filled with fluid under pressure comprising a closed chamber, said chamber having an input passage located near a first end thereof, an outlet passage located near said first end of said chamber, a U-shaped conduit in said chamber having one end connected to communicate with said input passage and an opposite open end, said U-shaped conduit extending from adjacent the first end to near the opposite end of said chamber and then back to a location adjacent the first end thereof and near the vertical center of said chamber, the outlet passage including a tubular member having a first open end that extends to a position adjacent the opposite end of said chamber and a second end communicating with the outlet passage.

11. The snubbing vessel of claim 9 wherein the vessel is a closed elongated cylinder.

12. The snubbing vessel of claim 9 including a valve member having an open and closed position associated with said input passage.

13. The snubbing vessel of claim 9 including a valve member having an open and closed position associated with said outlet passage.

14. The snubbing vessel of claim 9 including a second outlet passage at the first end of said chamber and a valve member having an open and closed position associated with said second outlet passage.

15. The snubbing vessel of claim 9 wherein the vessel chamber, the U-shaped conduit and the outlet passage tubular member are adapted to be filled with fluid.

16. The snubbing vessel of claim 9 wherein said vessel is adapted to accept any back flow of heavier fluid thru said outlet passage and having means including the position of the open end of the U-shaped conduit to prevent such heavier fluid from entering said U-shaped conduit.

17. The snubbing vessel of claim 14 wherein when filled with a fluid when the vessel chamber is overturned the fluid will immerse the open end of the U-shaped conduit to thereby aid in preventing backflow of any heavier fluid from said chamber.

18. The snubbing vessel of claim 15 wherein said fluid filling said chamber is a fluid whose flow is to be measured.

19. The snubbing vessel of claim 17 wherein said fluid filling said chamber is a fluid whose flow is to be measured.

* * * * *